United States Patent [19]

De Jager

[11] Patent Number: 5,439,627
[45] Date of Patent: Aug. 8, 1995

[54] PROCESS FOR MANUFACTURING REINFORCED COMPOSITES

[75] Inventor: Gui G. De Jager, Noordwijk, Netherlands

[73] Assignee: Flexline Services Ltd., Cyprus; a part interest

[21] Appl. No.: 977,425

[22] PCT Filed: Jun. 25, 1991

[86] PCT No.: PCT/NL91/00109

§ 371 Date: Feb. 23, 1993

§ 102(e) Date: Feb. 23, 1993

[87] PCT Pub. No.: WO92/00182

PCT Pub. Date: Jan. 9, 1992

[30] Foreign Application Priority Data

Jun. 29, 1990 [NL] Netherlands .................. 90201719

[51] Int. Cl.$^6$ .............................................. B29C 59/00
[52] U.S. Cl. ...................................... 264/129; 264/257
[58] Field of Search ............... 264/29.1, 29.5, 60, 264/62, 63, 82, 108, 140, 152, 257; 156/89

[56] References Cited

U.S. PATENT DOCUMENTS

| | | | |
|---|---|---|---|
| 2,992,960 | 7/1961 | Leeg | 154/128 |
| 3,766,000 | 10/1973 | Gibson et al. | 161/170 |
| 3,936,574 | 2/1976 | Marin | 428/408 |
| 4,071,594 | 1/1978 | Pearson et al. | 264/63 |

FOREIGN PATENT DOCUMENTS

| | | |
|---|---|---|
| 0249927 | 12/1987 | European Pat. Off. . |
| 0303499 | 2/1989 | European Pat. Off. . |
| 0312842 | 4/1989 | European Pat. Off. . |
| 0344663 | 6/1989 | European Pat. Off. . |
| 0406067 | 2/1991 | European Pat. Off. . |
| 0434501 | 6/1991 | European Pat. Off. . |
| 1259085 | 5/1972 | United Kingdom . |
| 8700563 | 1/1987 | WIPO . |

OTHER PUBLICATIONS

Feb. 18, 1983—vol. 7, No. 41—Memoranda.

*Primary Examiner*—Christopher A. Fiorilla
*Attorney, Agent, or Firm*—Zarley, McKee, Thomte, Voorhees & Sease

[57] ABSTRACT

This invention relates to a process for manufacturing composites and laminates reinforced with continuous or long fibers and/or filaments. The process includes the subsequent steps of (a) forming a preform of reinforcing material by arranging a green tape, ribbon, sheet or cloth including a number of continuous longitudinally oriented fibers or filaments which are spaced from each other by uniformly distributed particles, bonded by a flexible binder, (b) removing or converting a major portion of the binder into matrix material and, if applicable, (c) filling the voids and cavities with matrix material. Further, this invention relates to a process for manufacturing composites and laminates reinforced with chopped-aligned fibers and/or filaments, which includes chopping a green tape or ribbon as defined above, mixing the chopped tape or ribbon with a binder, lubricant and/or matrix material and forming mouldings from this mixture by any moulding method.

5 Claims, No Drawings

PROCESS FOR MANUFACTURING REINFORCED COMPOSITES

BACKGROUND OF THE INVENTION

The invention relates to reinforced shaped composites and laminates. More specifically, the invention relates to a process for manufacturing shaped composites and laminates reinforced with long or continuous fibers and/or filaments or chopped-aligned fibers or filaments, such as carbon matrix composites (FRCC's), ceramic matrix composites (FRCMC's), glass matrix composites (FRGMC's), glass-ceramic matrix composites (FRGCMC's), metal matrix composites (FRMMC's), intermetallic matrix composites (FRIMC's), cement, concrete or gypsum matrix composites and reinforced plastic composites and to filament tapes, ribbons, sheets or cloths for use in said process.

Composites and laminates, i.e. combinations of two or more materials, comprising matrix material(s) and reinforcing fillers, which form a bonded quasi-homogeneous structure with synergistic mechanical and physical properties compared to the basic matrix and filler materials, form an important class of construction materials in modern technology. Composites may be of two different types, viz. composites comprising a matrix with discontinuous filler system particles, platelets, whiskers, i.e. short fibers, flakes and chopped fibers, i.e. fibers of a length between say 3 mm and about 20 cm and composites comprising a matrix with preform moulding of long or continuous fibers and/or filaments. Laminates generally comprise a matrix with a number of laid up webs of long or continuous fibers and/or filaments or chopped fibers or filaments.

In principle the composites with chopped and in particular with continuous fibers and/or filaments and the laminates form preferable construction materials because they combine desirable intrinsic physical and/or chemical properties of the matrix with favourable strength and stiffness properties derived from the fibers and/or filaments. The chopped fibers or filaments and the long continuous fibers or filaments are basically used in four configurations (vide Kirk Othmer, Encyclopedia of Chemical Technology, third Edition, Supplement Volume, page 261) of which the unidirectional configuration (long or continuous fibers or filaments arranged substantially parallel to each other) and chopped-aligned configuration (chopped fibers or filaments all arranged in the same direction) in principal give the best performance. Because fibers afford significant control over the internal structure of the composite and because of their high aspect ratios (ratio of length to diameter), long, continuous fibers are the reinforcing elements of choice in high performance composites.

However, according to Mittnick and Mc. Elman in a paper entitled "Continuous Silicon Carbide Reinforced Metal Matrix Composites" presented at the SME Metal Matrix Composites '88 Conference, September 1988, pages 91–99, it is difficult when manufacturing composites which generally involve complex geometric shapes, to position continuous fibers during the fabrication process. The system described by Mittnick and Mc. Elman, the so called "green tape" system, the "plasma-sprayed aluminium tape" system and the "woven fabric" system of which the latter is said to be perhaps the most interesting, are indeed only suitable for manufacturing laminates of rather simple shape. In all these systems separate fiber sheets, each comprising a single layer of straight and parallel fibers held together by a temporary or permanent binder or cross-wave, are sequentially laid up into a mould in the required orientation to fabricate laminates. The method described for making the green tape comprises winding the fibers or filaments onto a foil-covered rotating drum, overspraying the fibers with a (temporary) resin binder, followed by cutting the layer from the drum to provide a flat sheet which is used for making a preform moulding by laying up. This method requires a careful control of the winding operation to keep the fibers or filaments parallel with the correct spacing. But even then, when the sheet or laid up and subsequently the temporary resin binder is removed, the orientation of the filaments gets at least partly lost.

In European patent application EP 249927 it is suggested to apply bundles of continuous fibers or filaments having fine particles, short fibers and/or whiskers deposited on the individual surfaces of the continuous fibers of filaments as reinforcing system for composites and/or laminates. These bundles of continuous fibers or filaments with fine particles, short fibers and/or whiskers deposited on the individual surfaces of the continuous fibers or filaments are formed by introducing said particles, short fibers and/or whiskers into a bundle of loose fibers or filaments. Under these circumstances a more or less uniform and homogeneous result is only obtained when both fine particles and short fibers or whiskers have been deposited on the individual surfaces of the continuous fibers or filaments. When only fine particles have been deposited on the surfaces of the continuous fibers, the fibers tend to bunch and when only whiskers or short fibers have been deposited on the surfaces of the continuous fibers or filaments, it is difficult to prevent the fibers or filaments from contacting each other. Filaments are easily damaged by the (sharp) materials deposited on the surfaces of the other filaments, and deposited material easily falls out and potentially damages shaping equipment.

A general problem encountered by applying usual preforms, produced from fiber products, is that the matrix cannot infiltrate sufficiently and homogeneously in between the bundles and the monofilaments of the reinforcement fibers. The interstitial space within the fiber bundles is often much smaller than the spaces between the fiber bundles used to produce the preform, and the rate of bundles infiltration relative to the preform infiltration become insufficient.

An object of the invention now is to provide composites and laminates reinforced with long or continuous fibers and/or filaments in a unidirectional configuration or with long chopped fibers or filaments in a chopped-aligned configuration. More in particular an object of the invention is to provide a process for manufacturing such composites or laminates in a cheap, easy and reliable manner, without the problems mentioned herein before. A further object is, to enable the application of automated and/or controlled thermoplastic type fabrication/melt-shaping techniques to shape complex preforms. A further object is, to avoid damage and/or degradation to the fibers/monofilaments during shaping and/or processing. A further object is, to avoid clustered fibers in the shaped preform. A further object is to substantially avoid preform shrinkage. A further object is to "tailor" the permeability of the preform. A further object is to ease the forming of a tailored matrix mix. A further object is to reduce the number of production steps, and/or production time and/or firing cycles. A further object is to obtain net-shape or near net-shape composite articles and/or integrated systems substantially eliminating costly machining. A further object is, to provide a novel green tape, ribbon, sheet or cloth with long or continuous fibers and/or filaments, which is suitable for use in the process of manufacturing composites or laminates according to the invention and which can produce a dense composite material. Further objects and advantages of the invention will appear from the following description of the principles and preferred embodiment of the invention.

It has been found that a correct, stable orientation of long or continuous reinforcing fibers or filaments is easily obtained when a number of long or continuous reinforcing fibers or filaments, say tow, roving or yarn, of such fibers or filaments is spread out in a single layer or a limited number of multi-layers, fibers or filaments are spaced by particles, such as granules, platelets, whiskers or flakes which are uniformly distributed between the fibers or filaments and this arrangement is fixed by means of flexible, organic- or other binder, thus forming a green tape, ribbon, sheet or cloth and that such a tape, ribbon, sheet or cloth can be arranged (e.g. by braiding, compressing, laminating, pultrusion, rolling, winding or weaving) to form a preform moulding wherein the fiber/monofilaments are protected during handling/shaping and the orientation and spacing of the fibers or filaments are maintained, thanks to the binders. These preform mouldings then are used as a reinforcing structure in manufacturing advanced composites and laminates, in particular carbon, ceramic, glass, glass-ceramic, metal and intermetallic composites. The invention is based on these findings.

SUMMARY OF THE INVENTION

In one aspect this invention relates to an improved process for manufacturing composites and laminates reinforced with continuous or long fibers and/or filaments, such as carbon matrix composites (FRCC's), ceramic matrix composites (FRCMC's), glass matrix composites (FRGMC's), glass-ceramic matrix composites (FRGCMC's), metal matrix composites (FRMMC's), intermetallic matrix composites (FRIMC's), cement, concrete or gypsum matrix composites and reinforced polymers, which includes the subsequent steps of (a) forming a preform of reinforcing material by arranging (e.g. braiding, compressing, laminating, laying up, winding and/or weaving) a green tape, ribbon, sheet or cloth comprising a number of continuous longitudinally oriented fibers or filaments which are spaced from each other by means of uniformly distributed particles, bonded by means of a flexible binder, (b) removing or converting a major portion of the binder into matrix material and, if applicable, (c) partly or completely filling the voids and cavities with matrix material.

In another aspect the present invention relates to an improved process for manufacturing composites and laminates reinforced with chopped-aligned fibers and/or filaments, which includes chopping a green tape or ribbon comprising a number of continuous longitudinally oriented fibers or filaments which are spaced from each other by means of uniformly distributed particles, bonded by means of a flexible binder, optionally mixing the chopped tape or ribbon with a binder, lubricant and/or matrix material and forming mouldings from this mixture by centrifugal, compression, injection, reaction, extrusion, cast, vacuum or other moulding. Preferably this process also includes the step of removing or converting a major portion of the binder into matrix material after the moulding step.

DETAILED DESCRIPTION OF THE PREFERRED EMBODIMENT(S)

It is an essential feature of the invention that the green tape, ribbon, sheet or cloth comprising a number of continuous longitudinally oriented fibers or filaments which are spaced from each other by means of a dosed amount of uniformly distributed particle material(s) of tailored/predetermined size, bonded by means of a flexible binder, are used as a starting material for manufacturing the preform moulding or for producing an injection moulding mixture comprising chopped ribbon or tape and possibly additional binder, lubricant and/or matrix material. Such tapes or ribbons preferably contain a tailored content of matrix particles mixed with a tailored content of flexible binder so that they easily can be arranged in the desired shaped preform moulding, while maintaining the orientation and spacing of the filaments and the distribution of the spacer particles.

These tapes or ribbons can suitably be manufactured by using standard techniques, such as adapting the teaching of UK patent 1259085. In agreement with the teaching of this patent, filaments grouped together in the form of a filament bundle or low twist thread, a roving or tow, are separated, e.g. by passing them through a venturi tube through which a fluid flows at high velocity or by giving all the filaments an electrostatic charge of the same sign so that the filaments repel each other, followed by applying a powdery treating agent comprising spacer particles and particles of a flexible low melting binder on the spread filaments and subsequently melting the binder to fix the spaced filaments and spacer particles.

A preferred prior art method for manufacturing the tapes or ribbons is the method disclosed in European Patent 274464, which is cited here by way of reference. In accordance with this patent, but using the specific components of the present invention, bundles of filaments, such as rovings, are spread out in a single layer wherein the individual filaments are close together and a suspension of spacer particles and particles of a flexible, low melting binder in a fluid stream (preferably a gas stream) is subsequently directed onto the spaced bundle under a controllable pressure such that the filaments in the spaced bundle are separated by the fluid stream and the particles penetrate uniformly between the filaments, and finally melting the binder to fix and encapsulate the filaments and spacer particles. Especially by the latter method a very uniform distribution of the spacer particles is obtained in a continuous process.

The type of reinforcing fibers or filaments used must be adapted to the type of reinforced composite or laminate made. Preferably, for any type of reinforced composite or laminate monofilaments are used, which give optimum strength with a minimum of handling problems.

Such filaments may have diameters between about 0.3 $\mu$m and 0.3 mm and preferably have diameters between 1 $\mu$m and 0.2 mm and in particular between 2 $\mu$m and 0.15 mm.

Further, for any type of reinforced composite or laminate the reinforcing filaments or fibers should readily and optimally bond to the matrix used. For reinforced plastics the fibers or filaments in the green tape or ribbon preferably are high strength, high stiffness, low density fibers; this gives the most favourable combination of properties. Suitable fibers or filaments for this use are chosen from the group of aramid, boron, carbon, ceramic, glass, graphite, metal, silicate or other fibers.

For refractory reinforced composites or laminates, which generally require treatment at high temperatures and/or pressures to fill the voids or cavities in the preform mould, the reinforcing filaments or fibers must resist degradation in contact with molten, reaction bonded or sintered matrix materials. For this purpose the fibers or filaments in the green tape, ribbon, sheet or cloth preferably are refractory high performance fibers or filaments or fiber hybrids suitable for use in FRCC, FRCMC, FRGMC, FRGCMC, FRMMC, FRIMC and other composites and laminates. Preferably those fibers or filaments are chosen from the group comprising carbon or graphite, possibly protection coated, types based on pitch or polyacrylonitride (PAN) precursor, or oxides, carbides, nitrides and borides of elements from group IIIA and IV A of the Periodic System and mixed oxides, carbides and nitrides of elements from group III a, IV a, III B through VII B and VIII of the Periodic System. Particularly suitable are coated carbon or graphite, alumina, alumina-boriasilica, aluminum nitride, alumina-silica, boron, boron carbide, boron nitride, boron nitride, magnesia, mullite, nitride, single-crystal sapphire, high purity silica, silica, silicon carbonitride, silicon carbide, silicon nitride titanium diboride, and zirconia fibers or filaments. Metallic types such as e.g. beryllium, stainless steel, molybdenum, titanium, and tungsten may also be used as fiber material. Synthetic diamond fibers can also be used.

The chosen reinforcing fibers or filaments are processed as described above, e.g. according to the teaching of UK patent 1259085, but preferably according to the teaching of EP 274464 to impregnate them with a mixture of spacer particles and binder particles. The function of the spacer particles is to separate the fibers or filaments uniformly over a certain distance and maintain the general longitudinal orientation of the fibers or filaments. To reach this effect, the spacer particles preferably are flakes, granules, platelets and/or whiskers and either consist of an inert material which may be an additional reinforcing component, or consist of a material which may form a component of the matrix. The characteristic dimensions of these flakes, granules, platelets or whiskers should be such that the reinforcing fibers or filaments are correctly spaced. In practice this means that the spacer granules and the flakes, platelets or whiskers have an average diameter and thickness, respectively, of the same order or preferably smaller than the thickness of the fibers or filaments.

The term "binder" as used herein and in the claims is meant to define the constituent or compound which holds the other components together; the agent applied to bond the fibers and particles prior to laminating or molding. The function of the binder is finally to bond, encapsulate and protect the fibers or filaments which are spaced from each other by means of the uniformly distributed spacer particles, as well as those spacer particles to a stable, shapeable, flexible tape, ribbon, sheet or cloth. For this purpose a flexible binder is used, which may be a permanent binder, e.g. a matrix plastic material when manufacturing reinforced plastics (e.g. rigid, highly crosslinked polymer having high thermal stability), or may be a temporary binder which must be removed or converted before introducing the second phase matrix material.

In the process of this invention for manufacturing composites and laminates reinforced with continuous or long fibers and/or filaments, a temporary binder is used, a major portion of which is removed or converted into matrix material in step (b).

Suitable temporary binders are natural or synthetic polymers and synthetic waxes having a low melting point, or mixtures thereof, which in step (b) are removed by heating. As waxes preferably petroleum waxes are used, because they are cheap and have good binding properties. Especially microcrystalline waxes which are ductile to tough are preferred. As polymer a material which leaves none or minimum residues after removal from a preform, especially a clean burning polymer such as a polymethyl-metacrylate, polyalkene carbonate, polypropylene carbonate or a olefine polymer, preferably polyethylene or polypropylene, or a water soluble binder material, e.g. methylcellulose, are preferred. They are cheap, have reasonably low melting points of the order of 150° to 185° C. and have a good binding power, leading to preferable flexible tapes, ribbons, sheets or cloths.

Preferably binders are recycled in the feedstock. Debinding time (or time required for binder removal) is reduced, since the matrix paticles present between the monofilaments keep the filaments spaced, and the preform or molded structrue becomes more and more porous during debinding.

Examples of temporary binders which may be converted in step (b) include the following:

In the specific case wherein carbon material forms all or part of the matrix material, e.g. carbon/carbon composites, a pre-carbon polymer binder/precursor is used which leaves an appreciable mass and volume of carbon after pyrolysis, e.g. a bulk mesophase/pitch, epoxy, furan, furfuryl alcohol, furfuryl ester, polyarylacetylene (PAA), polyamide (PA) polybenzimidazole (PBI), polyphenylenesulfide (PPS) or phenolic resin or mixture hereof.

In the specific case wherein ceramic material forms all or part of the matrix material, e.g. SiC or SiN composite, the binder, or part of it, is a precursor material with high ceramic char yields, which in step (b) is converted into ceramic material by heating/chemical synthesis. Such a binder is preferably a silicon based organo-metallic compound, a polysilane or polysilazane. Pyrolysis of polymeric metallo-organic mixes is a cost-effective and lower temperature route to produce ceramic materials while polysilazanes are being used to produce SiN ceramic materials. Many new precursor materials are presently being developed.

The binder is generally used in the form of powder. The particle size of the binder is dependent upon the impregnation process used, it may be smaller, equal or larger than the particle size of the spacer granules, whiskers of flakes, e.g. between about 0.1 $\mu$m and 50 $\mu$m or more, to result in a uniform distribution of the binder particles between the fibers or filaments and the spacer elements after final distribution of the binder, preferably by melting. Liquid precursor which becomes solid at environmental temperature can also be used as a binder.

The fibers or filaments, the spacer particles and the binder are used in such proportions that indeed a uniform and stable tape, ribbon, sheet or cloth is obtained which is sufficiently flexible to be arranged into preform which gives the desired reinforcement to the composites or laminates which are finally made by introducing matrix material and consolidation/ densification of the shaped article. If desired, the binder polymers may contain a plasticizer to improve the flexibility. Polymer and wax mixtures may be used. This result is reached with a proportion of fibers or filaments of about 5 to 7 vol. % calculated on the volume of the tape, ribbon, sheet or cloth and preferably 20–55 vol. % and more preferably 30–50 vol. % and with a proportion of spacer particles of about 3–50 vol. % and preferably 5–30 vol. % and more-preferably 10–25 vol. % calculated on the volume of the tape, ribbon, sheet or cloth, the remainder being binder.

Besides the fibers or filaments, the spacer particles and the binder, if desired for reasons of process or results, also small amounts of further additives, such as additions, chemical activators, colorants, dopants, foams, hollow fillers, lubricants, nucleating agents and/or reactants can be added f.e. to improve the surface properties of the fibers or filaments and possibly of the spacer particles, and to obtain a good distribution of the filler.

Particles of a reactive material are possibly encapsulated by a thin layer of non reactive material, preferably by a (precursor) binder, prior to handling/impregnation/infiltration. This substantially eliminates explosion and oxidation danger and eases the precautions required to handle fine reactive metal particulates e.g. by inert gas blanketing.

The flexible green tape, ribbon, sheet or cloth, which is made in this way retains the orientation and the spacing of the mono-filaments and the distribution of the particles, and can be fabricated/melt-shaped like a flexible thermoplastic prepreg into a carefully engineered preform by braiding, compressing, laminating, pultrusion, rolling, stacking, weaving and/or winding, or can be chopped, optionally followed by mixing the chopped tape or ribbon with binder and/or lubricant and/or additional particle material, suitable for moulding and forming mouldings by any usual molding method. The term "preform" as used herein and in the claims is meant to define the preshaped fibrous reinforcement formed to a desired shape prior to being placed in a mold.

In order to ease the forming of the preform, it generally is of advantage to supply a monitored heat source in order to soften the binder, thus improving shaping-flexibility of the "green yarn". In this way complex shapes (such as 3-D, Adjacent Yarn Position Exchange (AYPEX), a special type of three-dimensional braiding, knitting, multi-layer weaving and hybrid weaves which are combinations of 3-D orthogonal weaves and 3-D braids) with selective yarn reinforcement can easily be preformed. The homogeneity of the preform determines the uniformity of the final articles and products. Heat and pressure can be applied to improve this homogeneity. The original separation between the mono-filaments and/or the mono-filaments distribution which is present in the "green yarn" is substantially maintained during shaping of the preform. Fiber-to-fiber contact is highly eliminated, which prevents monofilament breakage or damage and also improves transverse strengths.

For refractory reinforced composites or laminates, the fibrous particulates/powdery shaped (green) preform is then transferred to a mould and:

the precursor polymer binder is processed (chemical synthesis/pyrolysis of polymer precursor), or the "clean-burning" binder is removed, by any conventional removal method.

During the above-mentioned treatment, cavities/void spaces can develop in between the fibers or filaments and the spacer particles, being hold in place in between of the mono-filaments.

After processing the product is a porous preform with homogenously distributed fine pores in between of the monofilaments and the spacer particles. The size of the pores is controlled by the size and quantity of the spacer particles and the volume of the precursor and/or clean-burning binder used to impregnate the fibers/monofilaments.

The original shape is substantially maintained because the uniformly distributed matrix particles hold the fibers/monofilaments spaced before, during and after chemical synthesis/pyrolysis of polymer precursor and/or binder removal. Preform shrinkage is substantially avoided. Due to the presence of these particles, homogeneously distributed in between of the monofilaments, the mono-filaments are hold in positive "angle plied" alignment and remain well spaced side by side across the preform, which gives an improved flexural strength of the preform. The permeability of the preform is highly governed by the homogeneous distribution of the particles/mono-filaments, and can accurately be engineered/optimized by choosing the dimensions of the particles which are entrapped in between of the fibers/monofilaments during the impregnation process, and which keep the mono-filaments properly spaced during following pyrolysis of the polymer precursor or removal of the binder, and subsequent preform reinfiltration/CVI.

After the permeable preform has been obtained in this way, the void spaces between the mono-filaments and the particles are then filled up/reinfiltrated by any of the usual preform reinfiltration methods or combinations thereof, e.g. by gravity, continuous, inert gas pressure or vacuum infiltration with a matrix material (in liquid/melt or slurry form) by chemical vapour infiltration (CVI), by chemical/diffusion or reaction bonding, or by forming a matrix material in situ by reaction at relative low temperatures between infiltrated liquid or solid/slurry materials and appropriate gases (e.g. directed metal oxidation). Infiltration lengths can be increased with no or lower pressure and in short times and preferably at lower temperatures, and a more complete and faster infiltration of the second phase matrix material is obtained, thus reducing the danger of fiber degradation. In these filling steps additives can be included to improve the flowability of infiltration material(s) in the case of a liquid or slurry and in the case of ceramic matrix material a sintering aid can be added in order to avoid interface-strengthening. If required this infiltration can be repeated, probably after a heat and/or pressure treatment, until the pores are minimized. The homogeneity of the preform intra monofilament spacing and the more complete infiltration step of the preform leads to a substantially minimization and uniformity of shrinkage. Because of the significant amount of matrix material already present, reinfiltration to full density can be done at lower pressures and in a considerably shorter time than with the usual infiltration/CVI process, and process cost-efficiency is enhanced. The void spaces between the mono-filaments and the particles may alternatively be partially filled with a matrix material by any of the above-mentioned methods. The voids are only filled to a predetermined extent, which allows the manufacture of articles such as membranes, filters, catalyst supports and bio-composite materials still possessing pores.

The process of the invention is ideal for structural composites submitted to high stresses. The shaped composites or laminates obtained by the process of the invention are suitable for high performance applications, such as in aerospace, automobile, chemical and petrochemical, fusion or plasma reactors, grinding tools, defence and other, where continuous and long fiber reinforced composites, like carbon, carbon/ceramic, ceramic, glass, glass/ceramic, metal, intermetallic and others are and will be required. Especially aerospace applications need stiff very high performance materials, e.g. for air-breathing propulsion systems, such as gas turbine components, heat-shields, rocket nozzles, ramjet combustors and both primary structures and airframes for reusable aerospace (hypersonic) vehicles and satellites, that can be fabricated into complex shapes. Special features can be built in e.g. electrical conductivity/discontinuity/ heating, magnetic, shape memory, thermal conductivity.

Functionally Gradient Materials (FGM), wherein a certain material or combination of materials gradually changes its composition along the thickness or shape, and becomes a different material or combination, is crucial for the production of engine parts and airframe and propulsion systems of future high speed airplanes/space planes. In these applications lightweight construction materials are demanded. These materials must be able to withstand higher temperature than conventional metals and still demonstrate high strength and impact resistance, e.g. super heat-resistant structural materials wherein ceramic material on one side provides the heat-resistant function and metal on the other side provides the strength property and the composition in one article or shape gradually varies from one side to the other. Other examples are Carbon-Carbon/Ceramic gradients etc. Since there is no interface between the two materials, problems with boundary by thermal stress at the boundaries is avoided.

Other combinations can be engineered based on abrasion, chemical resistance, density, flaw, friction, hardness, melting point, stiffness, strength, thermal expansions, toughness, wear resistance, etc. and combinations thereof.

Chemistry/Compositions/Microstructure of gradient materials can be engineered, e.g. by applying precursors, CVD, PVD or other methods or combinations thereof of infiltration/impregnation, e.g. precursors, both high yields polymer for liquid infiltration and gasses for CVI.

The application of pressure and/or temperature gradients during the infiltration/impregnation can improve processing results. Membranes, filters and catalyst supports for environment and other applications are produced, as a result of the potential to tailor the predetermined porosity, whereby charged molecules and/or active chemical groupings can be added to membrane surfaces or infiltrated, in the pores, possibly in a gradual manner.

Superconductor composites in the form of coils, tubes, wires or other shapes can be produced by extrusion or other methods of shaping, e.g. by using superconductive oxide particles and/or fibers possibly mixed with organometallic precursors of superconductive oxide.

Applying electricity, microwaves, radiation or other energy source to a shaped composite can, dependent upon the constituents, modify certain characteristics of the composite, e.g. bonding, chemical resistance, electrical conductivity, electro optic, magnetic, porosity and others, as well as combinations thereof.

Bio-composite materials that mimic biological organisms can be made, e.g. artificial bones where part of the porosity can be infiltrated with medical "donors/precursors" and porosity can assist natural bone bonding/forming. On the other hand electro-ceramic, shape memory alloys, piezoelectric and magnetostrictive materials are increasingly being applied.

In order to obtain "smart materials and structures" based on carbon, ceramic, glass, metals and the like, it is possible to include all sorts of insertions in the pre-shape in order to monitor structural integrity during moulding, acoustic-, vibration control and other active control, damage- and failure detection and thermal expansion during use of the formed materials and structures. Insertions could be: e.g. actuators, piezoelectrics, shape Memory alloys and fibers, strain sensors especially fiber-optic strain rosettes.

EXAMPLE 1

Continuous Graphite Fiber Reinforced—Aluminum-Magnesium-SiC Particulate Structural Aircraft Parts Continuous protection coated graphite monofilament yarn (diameter 10 $\mu$m) is homogeneously impregnated with a mixture of powdery Aluminum/Magnesium alloy (Al-Mg) of particle size 8 $\mu$m, SiC particles (1 $\mu$m), and powdery polypropylene binder material (particle size 15–20 $\mu$m). The preform has a pre-defined selective monofilament reinforcement according to the processing requirements and the characteristics dictated by the end-use requirements of the article. The alloyed matrix/binder mix content is tailored, taking into account the flexibility required for subsequent complex shaping. Homogeneous impregnation is performed at high speed and under inert gas, using the continuous binder/particulate/powder impregnation process as described in EP 274464. The composition of the tape is 50 vol. % graphite monofilaments, Al-Mg alloy powder matrix spacer particles 20 vol. % including SiC particles and binder 30 vol. %. (The Mg content being 6 weight % of the Al-Mg alloy matrix). To improve the wetting of the ceramic powdery particles, which would normally not be wetted by molten aluminum, magnesium is added to the matrix material, wherein magnesium improves wetting ability. Inert gas is used to prevent explosion and corrosion/degradation during treatment of Al-Mg, e.g. handling impregnation, melting.

The impregnated yarn is transported through an infrared heating oven, the binder material melts and encapsulates the Al-Mg powder particles, including SiC, and holds them homogeneously distributed in between of the monofilaments. Lamination/calibration shapes the "green tape" into a carefully engineered preform. In order to ease the forming of the preform a monitored infrared heat source is applied to soften the polymer binder, and hence to improve the formability of the "green tape" during preform shaping and fix the preform during subsequent cooling. A complex shape with selective yarn reinforcement is preformed. The original separation between the mono-filaments and/or monofilaments distribution present in the "green yarn" is maintained during shaping of the engineered preform.

The fibours-powdery preform is then transferred to a mould, embodying the shape of the final structure, and the binder is removed (by heating under vacuum where volatilization occurs). During this removal of the binder material, cavities/void spaces develop in between of the entrenched Al-Mg matrix powders/SiC particulates, being hold in place in between of the mono-filaments. Nitrogen "cleaning gas" is applied during binder removal, in order to remove any contamination of the fibers or impregnated particles.

The preform is pre-heated, and the cavities between the mono-filaments and the particles are then vacuum infiltrated by liquid Al-Mg matrix material, at 850°-950° C. under a low inert gas pressure.

In this way a shaped composite article with excellent properties and with a substantial weight saving, e.g. 35-40%, compared to conventional Al-Mg alloy, is obtained with sustained mechanical performance. Since graphite fibers have a negative thermal expansion, and aluminium a positive, the structure is engineered to have no expansion at temperature changes.

When repeating the process using other reinforcing filaments similar preforms can be made. Instead of a metal matrix other matrix materials or matrix combinations can be used as well.

Ceramic composites can be made in a similar way, whereby the metal particles/molten metal form the pre-ceramic precursor material and chemical synthesis can for example be performed via an oxidation reaction between the metal and the oxidant.

Direct metal oxidation technology could also be used, whereby the (additional) metal is progressively drawn through its own oxidation product and the preform by capillary action to sustain the growth process into the preform (LANXIDE patented directed oxidation process).

Examples of ceramic matrix materials include, but are not limited to, aluminum oxide, aluminum nitride, zirconium nitride, titanium nitride and AlN matrix.

Metallic pre-cursor fibers can be used as a fiber or part of hybrid fiber material to shape the preform. They are next converted to ceramic material by oxidation reaction.

EXAMPLE 2

Injection Molding of Long SiC Fiber Reinforced—Aluminum Article

Now a test is made for the high volume production of complex parts. Tape material similar to example 1, using a polypropylene binder, is chopped into lengths of 10 mm. The composition of the tape is 30 vol. % SiC monofilaments, Al-Mg alloy powder (5μm) matrix spacer particles 40 vol. % including SiC particles (0.5 μm) and binder 30 vol. %. (The Mg content being 6 weight % of the Al-Mg alloy matrix).

The chopped tape is mixed with additional binder 10% and lubricant to achieve a toothpaste like mix that can be injected into a multiple mould cavity. The injection moulded article is removed from the mould and the binder is removed by a combination of solvent extraction and/or heat treatment, whereby the binder is broken down and vaporized. The treatment is continued till a minimum quantity of binder is left to keep the shaped metal form together. The part is sintered at high temperature. In order to minimize shrinkage, ultra fine metal particles or molten metal can be infiltrated in the injection moulded part prior to sintering.

When repeating the process using most of the powdery metal as well as ceramic materials a large variety of articles can be moulded in this way.

EXAMPLE 3

Continuous Silicon Carbide Fiber Reinforced—SiC Matrix Article

Continuous SiC monofilament yarn (10 μm) is homogeneously impregnated with a mixture of SiC powdery spacer particles (3.5 μm) and polysilane pre-ceramic polymer precursor material (particle size 10-20 μm). In order to tailor the interfacial bond strength, a pyrolytic carbon interface coating is applied to the SiC monofilaments.

Homogeneous impregnation is performed at high speed, using the, continuous binder/particulate powder impregnation process as described in EP 274464, whereby binder is molten.

The composition of the tape is 50 vol. % SiC monofilaments, SiC particles 20 vol. %, and polysilane precursor binder polymer 30 vol. %.

The impregnated yarn is transported through an infrared heating oven, the precursor binder material melts and encapsulates the SiC particulates and holds them homogenously distributed. Lamination/calibration gives shape to the so formed "green tow".

The "green tape" is formed into a carefully engineered braided preform and combined with stacked laminates, taking care of the shrinkage on solidification, forming the "pressure armour" and subsequently helical preformed tapes are wound over this structure in clockwise and anti-clockwise layers, forming the tensile armour. The preform has pre-defined .selective monofilament reinforcement according to the shape and to the forces applied to the final cylinder structure.

The original separation between the mono-filaments and/or mono-filaments distribution as being present in the "green yarn" is substantially maintained during shaping of the engineered preform. The fibrous-powdery preform is then transferred to a mould, embodying the shape of the final structure, and the precursor is pyrolysed at reduced temperatures, low enough to prevent fiber degradation. The SiC particles, homogenously distributed in between of the mono-filaments, hold the mono-filaments in positive "angle plied" alignment and well spaced side by side across the preform, which allow for a much faster and highly improved infiltration of the second phase matrix material through chemical vapour infiltrated (CVI) by the thermal decomposition of an organo-silane, methyltrichlorosilane (MTS), in the presence of hydrogen at elevated temperature.

$Si_3N_4$ composites can be made in a similar way, using preceramic polysilazane binder material and chemical synthesis.

CVI, using nitrogen gas, can densify the preform after

"clean burning" binder removal or

"pre-ceramic precursor" binder synthesis.

CVI is preferably preformed at temperatures low enough (e.g. 800°-900° C.) to enhance uniform deposition/densification/infiltration and prevent premature closing of the preform-surface porosity. Other CVI possibilities include $Al_2O_3$, $ZrO_2$, $TiB_2$ and TiC. Sol-gel or Reaction bonding can also advantageously be applied. Ceramic pre-cursor fibers can be used as a fiber or part of hybrid fiber material to shape the preform. They are next converted to ceramic material by pyrolysation.

EXAMPLE 4

Carbon/Carbon Composite Article

Continuous graphite mono-filament yarn (diameter 10 μm) is homogeneously impregnated with a mixture of graphite powdery particles 3.5 μm and powdery polyamide (PA) binder material (particle size 10–20 μm, with an average of approximately 15 μm).

Homogeneous impregnation is performed at high speed, using the continuous binder/particulate powder impregnation process as described in EP 274464, whereby the graphite particles are homogeneously distributed and the PA binder is molten. The composition of the tape is 50 vol. % graphite monofilaments, graphite particles 25 vol. %, and powdery PA binder 25 vol. %. Thus more than 75% is already composed of carbon materials, which dramatically reduced production time of the C/C composite cone.

The impregnated yarn is transported through an infrared heating/melting oven, the PA binder material melts and encapsulates the graphite particulates and holds them homogeneously distributed. Lamination/calibration gives shape to the so formed "green tape".

The "green tape" is formed into a carefully engineered preform made by a combination of braiding and edge-wise tape winding.

The preform has pre-defined selective mono-filament reinforcement according to the rosette shape and to the forces applied to the final rocket exit cone structure. In order to improve the homogeneity, the preform is baked in a hot press and then subjected to high temperature heat treatment under inert nitrogen gas, further densified under low heat and low pressure and formed in the shape of the final rocket exit cone structure, to enable the production of the net-shape cone.

The fibrous-powdery cone preform is then transferred to a mould, embodying the shape of the final cone structure, and the PA binder material is pyrolysed by heating to over 800° C. in an inert atmosphere, leaving a carbon residue of the pyrolysed PA. The mass loss of the PA binder, associated with the pyrolysation process is a function of the temperature, and cavities/void spaces develop in between of the "impregnated" primary graphite particulates and PA secondary carbon matrix material, being hold in place in between of the mono-filaments.

The cavities between the mono-filaments and the carbon particles are vacuum pressure infiltrated, with hot pitch as a source of carbon, and pyrolysed again to increase the density. After rough machining the infiltration cycle is repeated until the required density of carbon matrix is achieved.

The composition cone is then finished by heating to 2400° to 2800° C., whereby the matrix undergoes a structural change into graphite.

Depending on the application, the hard carbon-carbon cone surfaces are coated/diffusion bonded to fill the outer plies with silicon carbide and protect the C/C composite against degradation of the properties by oxidation. Surface sealing can be applied for greater durability.

By using this process continuous fiber reinforced C/C composites, even in complex shapes, are made more constantly and far cheaper. Because of the large amount of carbon already present infiltration to full density can be done at lower pressures and in a considerably shorter time than with the prior art process.

These examples involve generally similar processing schemes for preform preparation. Improved infiltration offers the potential of substantially greater flexibility in processing complex net-shape composites since the presence of homogenously distributed cavities makes the preform permeable and thus highly facilitates the penetration of the matrix material in this inter-fiber void spaces, while penetration time is dramatically shortened since a substantial part of the matrix material(s) is generally present in the preform in powdery form and/or precursor and only additional infiltration of identical or compatible second phase matrix material is required.

What is claimed is:

1. A process for manufacturing a composite product reinforced by forming a molded preform to a desired shape and subsequently processing the preform into a final shaped composite product, comprising the steps of;
   (a) chopping a ribbon comprising a number of continuous longitudinally oriented fibers which are spaced from each other by uniformly distributed particles bonded therebetween by a flexible precursor binder;
   (b) mixing the chopped ribbon with a binder and at least one of a lubricant and a matrix material to form a mixture;
   (c) forming moldings from the mixture by a molding method;
   (d) converting the precursor binder into matrix material, thereby leaving voids between the fibers and the particles; and
   (e) filling the voids between the fibers and the particles with additional matrix material.

2. A process according to claim 1 characterized in that the uniformly distributed particles are granules, flakes, platelets, whiskers or mixtures thereof.

3. A process according to claim 2, characterized in that the uniformly distributed particles comprise material which can be integrated into the matrix material.

4. A process according to claim 2, characterized in that the uniformly distributed particles are pre encapsulated with the precursor binder so as to reduce the risk of explosion and oxidation of the particles.

5. A process according to claim 1, characterized in that the ribbon is treated such that the flexibility is improved prior to forming the preform.

* * * * *